United States Patent
Matherson et al.

(10) Patent No.: US 6,983,072 B2
(45) Date of Patent: *Jan. 3, 2006

(54) DARK FRAME SUBTRACTION USING COMPRESSION

(75) Inventors: Kevin Matherson, Fort Collins, CO (US); David J. Staudacher, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

This patent is subject to a terminal disclaimer.

(21) Appl. No.: 10/094,604

(22) Filed: Mar. 12, 2002

(65) Prior Publication Data

US 2003/0174894 A1 Sep. 18, 2003

(51) Int. Cl.
G06K 9/36 (2006.01)

(52) U.S. Cl. .................. 382/233; 382/275; 348/243

(58) Field of Classification Search ........ 382/274–275, 382/173, 232, 233, 254, 305, 312; 348/241, 348/243–251; 358/474, 483

See application file for complete search history.

(56) References Cited

U.S. PATENT DOCUMENTS

| | | | | |
|---|---|---|---|---|
| 4,942,474 A | * | 7/1990 | Akimoto et al. | 348/301 |
| 5,786,582 A | * | 7/1998 | Roustaei et al. | 235/462.07 |
| 5,926,214 A | * | 7/1999 | Denyer et al. | 348/241 |
| 6,101,287 A | | 8/2000 | Corum et al. | 382/274 |
| 6,646,245 B2 | * | 11/2003 | Nair | 250/208.1 |
| 6,714,241 B2 | * | 3/2004 | Baer | 348/241 |
| 6,747,696 B1 | * | 6/2004 | Nakata et al. | 348/243 |

* cited by examiner

*Primary Examiner*—Sanjiv Shah
*Assistant Examiner*—Sheela Chawan

(57) ABSTRACT

A method and system for improving the quality of an image in an electronic imaging system is disclosed. The method and system comprise capturing an image frame, capturing a compressed dark frame, decompressing a portion of the compressed dark frame and subtracting the decompressed portion of the compressed dark frame from a corresponding section of the image frame. The steps of decompressing a portion of the compressed dark frame and subtracting the decompressed portion from a corresponding section of the image frame are repeated for additional portions of the compressed dark frame.

20 Claims, 3 Drawing Sheets

DARK FRAME SUBTRACTION USING COMPRESSION

TECHNICAL FIELD

The technical field is electronic imaging, specifically methods for correcting the response of electronic imaging systems.

CROSS-REFERENCES TO RELATED APPLICATIONS

This application is related to U.S. patent application Ser. No. 10/094,604 to Staudacher et al., entitled "MULTI-PASS DARK FRAME SUBTRACTION" filed on Mar. 12, 2002 and incorporated herein in its entirety by reference.

BACKGROUND

The popularity of electronic imaging has been on the rise as imaging systems such as digital cameras provide consumers with the ability to capture digital images and display the images using personal computers. Electronic imaging allows for the electrical correction of imperfections in a captured image. These imperfections may result from manufacturing process variations and thermal processes and defects within the structures that comprise sensors included in imaging systems.

It is well known in the art that noise, or radiation, from dark current, or thermally-generated current, degrades captured images, resulting in speckles or a grainy appearance in uncorrected captured images. In order to electronically correct for dark current, a calibration procedure known as dark frame subtraction is typically used. In dark frame subtraction for digital cameras the dark current noise is represented by a dark frame that is captured separately from an image frame. The image frame depicts the desired picture. The dark frame is captured under identical conditions as the image frame, but with the mechanical shutter of the camera closed to prevent incident light on the image sensors of the camera. Therefore, the dark frame captures the imperfections caused by dark current noise originating from within the camera. The dark frame is subtracted from the image frame to obtain a corrected image. Dark frame subtraction cancels the dark offset noise in the image frame and improves the quality of the image frame.

In conventional dark frame subtraction, the image frame and dark frame are stored in separate random access memory (RAM) buffers. The image frame is captured and stored in one memory buffer. Following capture of the image frame, the dark frame is captured under similar conditions and stored in a second memory buffer. The image frame and the dark frame are equivalent in memory size and, therefore, require memory buffers of approximately the same size. A processor in the camera subtracts the dark frame from the image frame and the result is stored in the first memory buffer. Therefore, two full size memory buffers are required to perform conventional dark frame subtraction.

SUMMARY

A method for improving the quality of an image in an electronic imaging system is disclosed. The method comprises the steps of capturing an image frame, capturing a compressed dark frame, wherein the compressed dark frame is comprised of a plurality of portions, decompressing a first portion of the compressed dark frame and subtracting the decompressed first portion of the compressed dark frame from a corresponding section of the image frame. The steps of decompressing a portion of the compressed dark frame and subtracting the decompressed portion of the compressed dark frame from the corresponding section of the image frame for each of the remaining portions of the compressed dark frame are repeated until all of the portions of the compressed dark frame have been decompressed and subtracted from corresponding sections of the image frame.

An electronic imaging system is disclosed. The system comprises means for capturing an image frame, means for capturing a compressed dark frame, wherein the compressed dark frame is comprised of a plurality of portions, means for decompressing a first portion of the compressed dark frame and means for subtracting the decompressed first portion of the compressed dark frame from a corresponding section of the image frame. The electronic imaging system also comprises means for repeating the steps of decompressing a portion of the compressed dark frame and subtracting the decompressed portion of the compressed dark frame from the corresponding section of the image frame for each of the remaining portions of the compressed dark frame until all of the portions of the compressed dark frame have been decompressed and subtracted from corresponding sections of the image frame.

A method for improving the quality of an image obtained by an electronic imaging system is disclosed. The method comprises the steps of capturing an image frame, capturing a compressed dark frame, decompressing a first portion of the compressed dark frame and subtracting the decompressed first portion of the compressed dark frame from a corresponding section of the image frame. The steps of decompressing a portion of the compressed dark frame and subtracting the decompressed portion of the compressed dark frame from the corresponding section of the image frame are repeated for additional portions of the compressed dark frame.

Other aspects and advantages will become apparent from the following detailed description, taken in conjunction with the accompanying figures.

DESCRIPTION OF THE DRAWINGS

The detailed description will refer to the following drawings, wherein like numerals refer to like elements, and wherein.

DETAILED DESCRIPTION

Figure 1A:
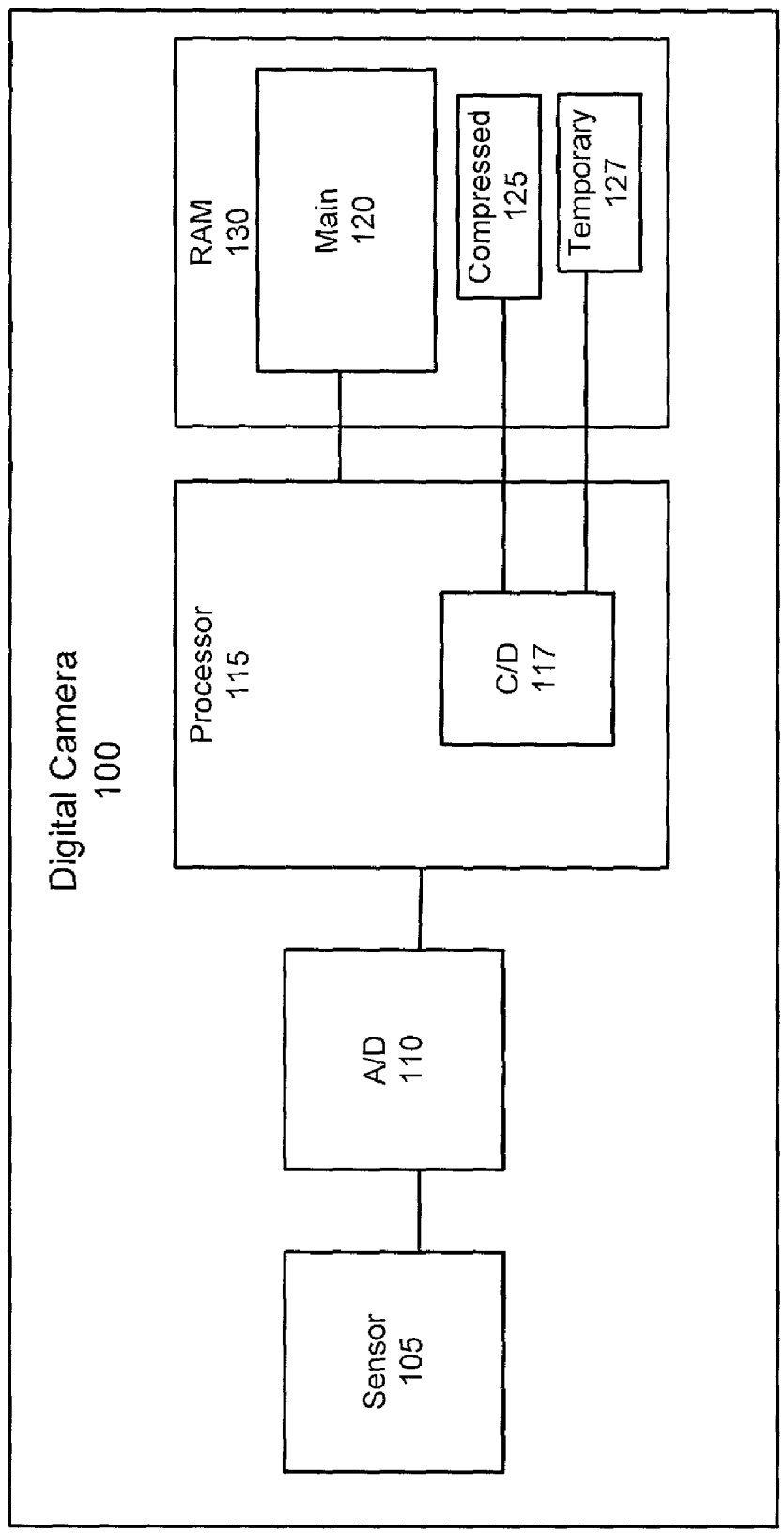
FIG. 1A is a schematic representation illustrating the capture of an image frame and a dark frame according to one embodiment.

FIG. 1A is a schematic representation illustrating the capture of an image frame and a dark frame according to one embodiment. In one embodiment, the electronic imaging system is a digital camera 100. A sensor 105 typically includes an array of light detecting elements, where each element produces a signal corresponding to the intensity of light impinging on that element when an optical image is focused on the array and detected. These signals may then be used, for example, to display a corresponding image frame on a monitor or otherwise used to provide information about the optical image. The light detecting elements are also capable of detecting forms of radiation other than light, including dark currents in the form of thermal radiation.

The sensor 105 may comprise, for example, a charge coupled device (CCD). A typical CCD comprises charge-integrating light detecting elements, or photosites, arranged in rows and columns. Each photosite responds to incident radiation by providing an electrical signal corresponding to one pixel of frame information. The sensor 105 may also comprise, for example, a complementary metal oxide semiconductor (CMOS) device. The CMOS device typically includes a photodiode or phototransistor used as a light detecting element, where the conductivity of the element corresponds to the intensity of light impinging on the element. The variable signal generated by the light detecting element is an analog signal whose magnitude is proportional to the amount of light impinging on the element.

The light detecting elements in the sensor 105 may be formed in a two dimensional core array which is addressable by row and column. Once a row of elements has been addressed, the analog signals from each of the light detecting elements in the row are coupled to the respective columns in the array. An analog/digital (A/D) converter 110 is used to convert the analog signals representing the image frame to digital signals.

A processor 115 reads the digital signals representing the image frame from the A/D converter 110 and stores the image frame in a main image buffer 120. The image frame is thereby captured by the digital camera 100. The captured image frame comprises a set of pixels, with each pixel having a numeric value representing the amount of charge contained in the corresponding light detecting element of the sensor 105. The dark frame is captured with a shutter of the digital camera 100 closed during exposure of the sensor 105 under similar conditions as the image frame. The dark frame is comprised of a set of pixels, with each pixel having a numeric value representing the amount of charge contained in the corresponding light detecting element of the sensor 105.

The processor 115 reads the digital signals representing the dark frame from the A/D converter 110 and then compresses the digital signals through a lossless compression scheme using a compression/decompression (C/D) unit 117. The C/D unit 117 is also capable of decompressing the digital signals through a lossless decompression scheme. The processor 115 may include an application specific integrated circuit (ASIC) that facilitates an accelerated ability for lossless compression of the digital signals representing the dark frame without significant time delay as the signals are received from the A/D converter 110. Additionally, the processor 115 may be capable of an accelerated ability for lossless decompression. The C/D unit 117 may comprise, for example, a dedicated hardware device or coprocessor located in the processor 115 that controls all of the logic for compression and decompression of the digital signals for the dark frame. Alternately, the C/D unit 117 may be a separate coprocessor located outside the processor 115. Any one of several known lossless compression and decompression schemes may be used in the C/D unit 117. Further, it is understood by those skilled in the art that lossy compression and decompression schemes may also be used in the C/D unit 117. The compression ratio of the C/D unit 117 may be, for example, 2:1 or 3:1. However, it is understood by those skilled in the art that the compression ratio may be even greater depending on the compression scheme used and the complexity of the image to be captured.

After the dark frame is compressed, the dark frame is stored in the compressed dark frame buffer 125. Portions of the dark frame are decompressed by the C/D unit 117 and are stored in a temporary buffer 127. The main image buffer 120, the compressed dark frame buffer 125 and the temporary buffer 127 are located in random access memory (RAM) 130. The captured image frame and the dark frame may comprise, for example, pixels arranged in a two dimensional array of rows and columns.

Figure 1B:
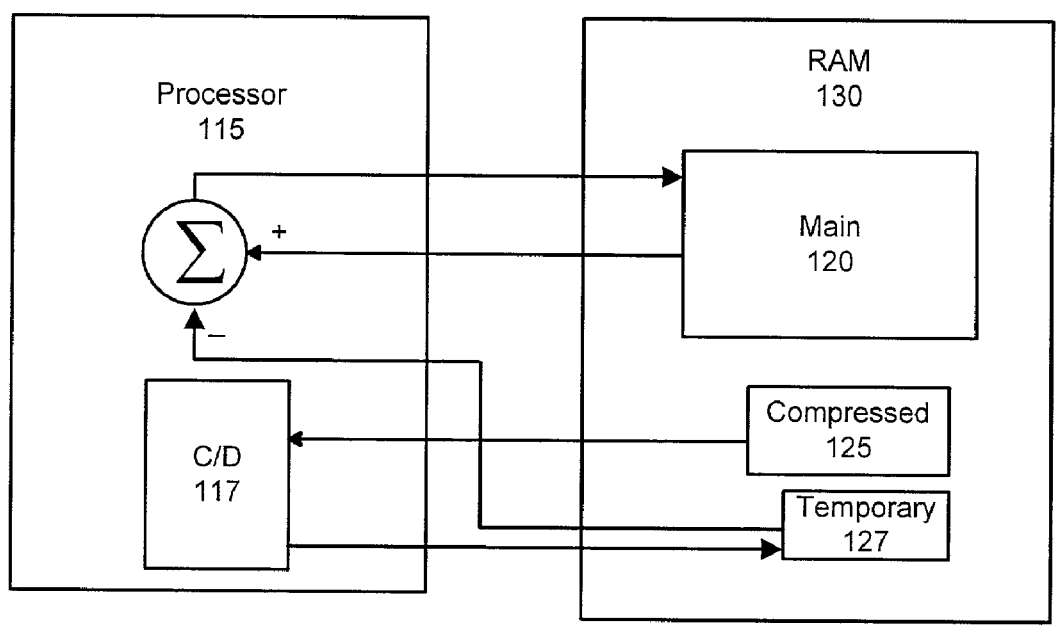
FIG. 1B is a schematic representation illustrating the subtraction of the dark frame from the image frame according to one embodiment.

FIG. 1B is a schematic representation illustrating the subtraction of the dark frame from the image frame according to one embodiment. The processor 115 reads the compressed dark frame from the compressed dark frame buffer 125 and the C/D unit 117 decompresses a portion of the compressed dark frame. The decompressed portion of the compressed dark frame is then temporarily stored in the temporary buffer 127. The processor 115 subtracts the decompressed portion of the compressed dark frame from a corresponding section of the image frame stored in the main image buffer 120. In the subtraction process, described in more detail below, successive decompressed portions of the compressed dark frame are iteratively subtracted from corresponding sections of the image frame until the entire image frame has been affected.

Figure 2:
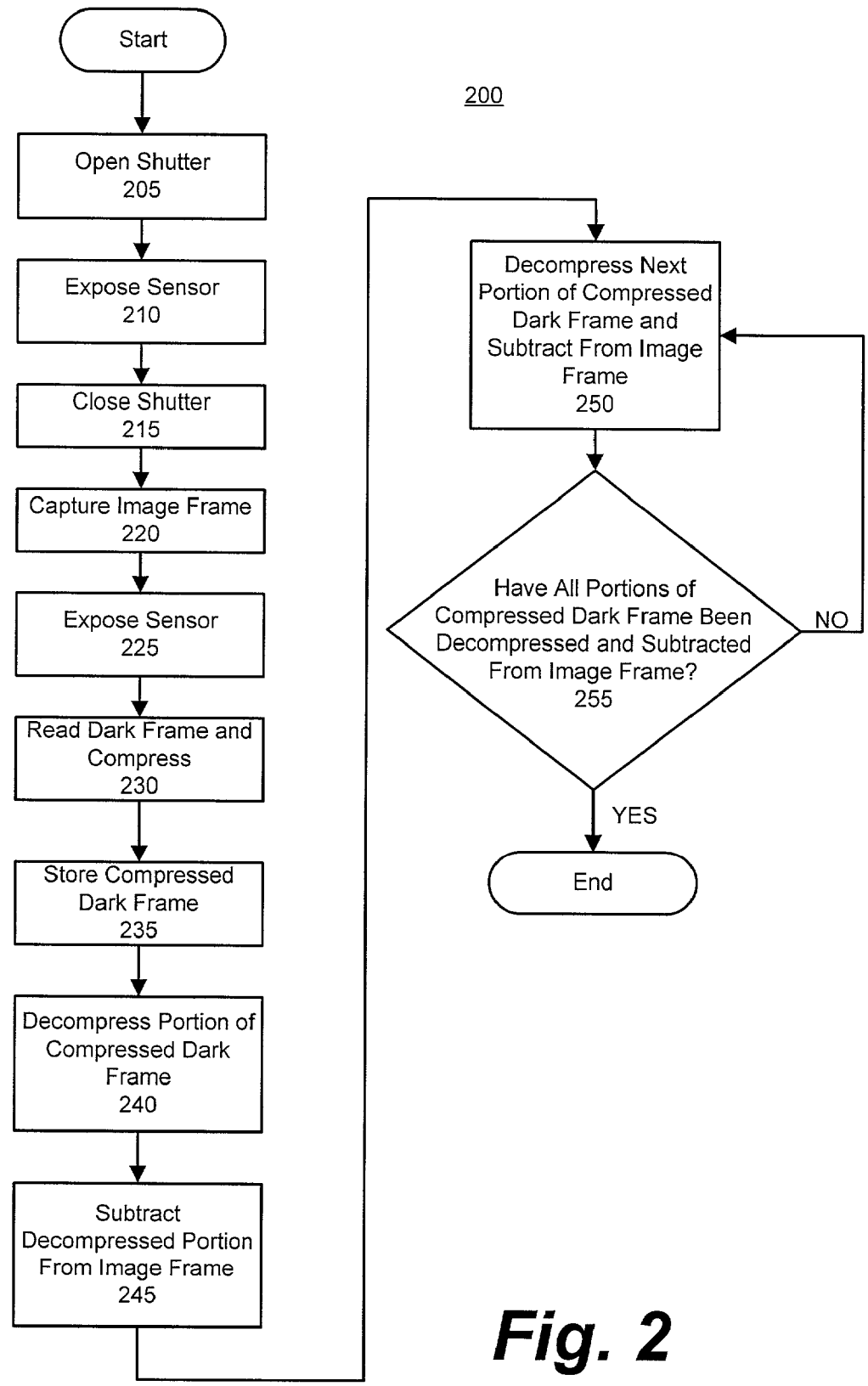
FIG. 2 is a flowchart illustrating a method for dark frame subtraction using compression according to one embodiment.

FIG. 2 is a flowchart 200 illustrating a method for dark frame subtraction using compression according to one embodiment. In step 205, the shutter of the digital camera 100 is opened, allowing the desired image to be focused on the sensor 105 and exposing the sensor 105 to incident light for a time $t_{exp}$ in step 210. During time $t_{exp}$ the sensor 105 is exposed to incident light originating externally from the camera and dark current noise originating internally within the digital camera 100. Time $t_{exp}$ is determined by the digital camera 100 depending on the amount of light available for obtaining the desired image. The shutter of the digital camera 100 is then closed in step 215. In step 220, the image frame is captured by being detected and recorded by the sensor 105, converted into digital signals by the A/D converter 110, read by the processor 115 and stored in the main image buffer 120.

In step 225, with the shutter of the digital camera 100 closed, thereby blocking any light originating externally from the digital camera 100, the sensor 105 is exposed to any dark current noise, or thermally-generated current, originating internally within the digital camera 100 for time $t_{exp}$. A dark frame of approximately the same size as the image frame is detected and recorded by the sensor 105 and converted into digital signals by the A/D converter 110.

In step 230, the dark frame is read by the processor 115 and the C/D unit 117 losslessly compresses the digital signals representing the dark frame almost simultaneously as they are received from the A/D converter 110. In step 235, after the dark frame is compressed, it is stored in the compressed dark frame buffer 125 in order to capture the dark frame. In step 240, the C/D unit 117 decompresses a first portion of the compressed dark frame and stores the decompressed portion in temporary buffer 127. Typically, the portions of the compressed dark frame are very small relative to the size of the full decompressed dark frame. Therefore, the temporary buffer is of very small size relative to the compressed dark frame buffer 125 or the main image buffer 120. For example, for a six megabit image frame, where a full decompressed dark frame would also be approximately six megabits, the size of a portion of the compressed dark frame to be decompressed may be one hundred kilobytes. The size of the temporary buffer 127 may be further decreased by decompressing smaller portions of the compressed dark frame at a time.

In step 245, the processor 115 subtracts the decompressed portion of the compressed dark frame from a corresponding section of the image frame. The processor 115 subtracts a value of each pixel in the decompressed portion of the compressed dark frame from a value of a corresponding pixel in the corresponding section of the image frame. The subtraction process may be repeated for every pixel in the decompressed portion of the compressed dark frame. The subtraction process may include, for example, subtracting the value of each pixel in a row of pixels in the decompressed portion of the compressed dark frame from the value of the corresponding pixel in the image frame, and then repeating this process for each subsequent pixel in the row of pixels and for subsequent rows of pixels in the decompressed portion of the compressed dark frame.

In step 250, once the decompressed portion of the compressed dark frame has been subtracted from the corresponding section of the image frame, a next portion of the compressed dark frame is decompressed by C/D unit 117 and is stored in temporary buffer 127 by overwriting the prior decompressed portion. In step 255, step 250 is repeated until all portions of the compressed dark frame have been decompressed and subtracted from corresponding sections of the image frame. The result is an improved image frame that has been corrected for the effects of dark current noise.

It is understood by those skilled in the art that the method described above may be applied to the converse situation where the captured image frame is compressed instead of the captured dark frame.

Using the dark frame subtraction method described above, the capacity of the compressed dark frame buffer 125 may be significantly less than the capacity of the main image buffer 120, since the compressed dark frame buffer 125 stores a compressed form of the dark frame. The capacity of the compressed dark frame buffer 125 need only be large enough to contain a compressed dark frame, the size of which is determined by the compression ratio as described above. Since typical compression ratios may be 2:1 or 3:1, the compressed dark frame may be, for example, one-half or one-third of the size of the image frame. By increasing the compression ratio in the C/D unit 117, the size of the compressed dark frame buffer 125 may be further decreased.

Dark frame subtraction using compression would allow dark frame subtraction in electronic imaging systems that would otherwise not have enough memory to perform conventional dark frame subtraction. Further, for electronic imaging systems capable of conventional dark frame subtraction, the decreased memory requirement allowed by dark frame subtraction using compression may result in additional memory space that may be used for an auxiliary image buffer. The auxiliary image buffer may be used to allow two or more image frames to be captured and stored in rapid succession before any processing is performed, thereby effectively providing a faster shot-to-shot time for the electronic imaging system.

While the present invention has been described in connection with an exemplary embodiment, it will be understood that many modifications will be readily apparent to those skilled in the art, and this application is intended to cover any variations thereof.

What is claimed is:

1. A method for improving the quality of an image in an electronic imaging system, comprising the steps of:
   (a) capturing an image frame;
   (b) capturing a compressed dark frame, wherein the compressed dark frame is comprised of a plurality of portions, and wherein each of the plurality of portions comprises a plurality of pixels corresponding to a separate section of the image frame;
   (c) decompressing a first portion of the compressed dark frame;
   (d) subtracting the decompressed first portion of the compressed dark frame from a corresponding section of the image frame; and
   (e) repeating steps (c) and (d) for each of the remaining portions of the compressed dark frame until all of the portions of the compressed dark frame have been decompressed and subtracted from corresponding sections of the image frame.

2. The method of claim 1, where step (a) further comprises:
   exposing a sensor to radiation that is internal and external to the electronic imaging system;
   detecting an image frame by the sensor;
   converting analog signals representing the image frame from the sensor to digital signals by an analog/digital (A/D) converter;
   reading the digital signals by a processor; and
   storing the image frame in a main image buffer.

3. The method of claim 1, where step (b) further comprises:
   exposing a sensor to radiation that is internal to the electronic imaging system;
   detecting a dark frame by the sensor;
   converting analog signals representing the dark frame from the sensor to digital signals by an A/D converter;
   reading the dark frame by a processor;
   compressing the dark frame by a compression/decompression (C/D) unit; and
   storing the compressed dark frame in a compressed dark frame buffer.

4. The method of claim 3, where step (c) further comprises:
   reading a portion of the compressed dark frame by the processor;
   decompressing the portion of the compressed dark frame by the C/D unit; and
   storing the decompressed portion of the compressed dark frame in a temporary buffer.

5. The method of claim 1, where the image frame and the portions of the compressed dark frame comprise pixels, wherein each pixel has a value.

6. The method of claim 5, where step (d) further comprises subtracting a value of each pixel in the decompressed portion of the compressed dark frame from a value of a corresponding pixel in the corresponding section of the image frame.

7. The method of claim 5, where step (d) further comprises:
   subtracting the value of each pixel in a row of pixels in the decompressed portion of the compressed dark frame from the value of the corresponding pixel in the image frame; and
   repeating the subtracting step for each subsequent pixel in the row of pixels and for subsequent rows of pixels in the decompressed portion of the compressed dark frame.

8. The method of claim 1, where the electronic imaging system is a digital camera.

9. An electronic imaging system comprising:
   means for capturing an image frame;

means for capturing a compressed dark frame, wherein the compressed dark frame is comprised of a plurality of portions, and wherein each of the plurality of portions comprises a plurality of pixels corresponding to a separate section of the image frame;

means for decompressing a first portion of the compressed dark frame;

means for subtracting the decompressed first portion of the compressed dark frame from a corresponding section of the image frame; and means for repeating the steps of decompressing a portion of the compressed dark frame and subtracting the decompressed portion of the compressed dark frame from the corresponding section of the image frame for each of the remaining portions of the compressed dark frame until all of the portions of the compressed dark frame have been decompressed and subtracted from corresponding sections of the image frame.

10. The electronic imaging system of claim 9, where the means for capturing the image frame further comprises:
   a sensor;
   an A/D converter;
   a processor; and
   a main image buffer.

11. The electronic imaging system of claim 10, where the sensor comprises a charge coupled device.

12. The electronic imaging system of claim 10, where the sensor comprises a complementary metal oxide semiconductor device.

13. The electronic imaging system of claim 9, where the means for capturing the compressed dark frame further comprises:
   a sensor;
   an A/D converter;
   a processor;
   a CID unit; and
   a compressed dark frame buffer.

14. The electronic imaging system of claim 13, where the sensor comprises a charge coupled device.

15. The electronic imaging system of claim 13, where the sensor comprises a complementary metal oxide semiconductor device.

16. The electronic imaging system of claim 13, where the processor comprises means for accelerated compression of digital signals.

17. The electronic imaging system of claim 13, where the processor comprises means for accelerated decompression of digital signals.

18. The electronic imaging system of claim 9, where the means for decompressing the portion of the compressed dark frame further comprises a temporary buffer.

19. The electronic imaging system of claim 9, where the electronic imaging system is a digital camera.

20. A method for improving the quality of an image obtained by an electronic imaging system, comprising the steps of:
   (a) capturing an image frame;
   (b) capturing a compressed dark frame;
   (c) decompressing first portion of the compressed dark frame, wherein the first portion comprises a plurality of pixels;
   (d) subtracting the decompressed first portion of the compressed dark frame from a corresponding section of the image frame; and
   (e) repeating steps (c) and (d) for additional portions of the compressed dark frame.

* * * * *

UNITED STATES PATENT AND TRADEMARK OFFICE
CERTIFICATE OF CORRECTION

PATENT NO. : 6,983,072 B2  
APPLICATION NO. : 10/094604  
DATED : January 3, 2006  
INVENTOR(S) : Kevin Matherson et al.

Page 1 of 1

It is certified that error appears in the above-identified patent and that said Letters Patent is hereby corrected as shown below:

In column 8, line 2, in Claim 13, delete "CID" and insert -- C/D --, therefor.

In column 8, line 25, in Claim 20, after "decompressing" insert -- a --.

Signed and Sealed this

Eighteenth Day of August, 2009

David J. Kappos  
*Director of the United States Patent and Trademark Office*